United States Patent [19]

Goto et al.

[11] Patent Number: 4,682,554

[45] Date of Patent: Jul. 28, 1987

[54] METHOD AND APPARATUS FOR PERFORMING SEWING OPERATIONS UTILIZING SEWING MACHINE HAVING MEANS TO ADJUST TERMINAL STITCH PITCH AND SEW CONSECUTIVE PATTERNS

[75] Inventors: Sumio Goto; Jiro Ishibashi; Masakazu Nemoto, all of Chofu, Japan

[73] Assignee: Tokyo Juki Industrial Co., Ltd., Chofu, Japan

[21] Appl. No.: 869,678

[22] Filed: Jun. 2, 1986

[30] Foreign Application Priority Data

May 31, 1985 [JP] Japan .................................. 60-119592

[51] Int. Cl.$^4$ .......................... D05B 19/00; D05B 27/22
[52] U.S. Cl. ............................. 112/262.1; 112/266.1; 112/454; 112/315; 112/121.11
[58] Field of Search .................... 112/454, 275, 121.11, 112/121.12, 315, 314, 277, 262.1, 2, 272, 266.1

[56] References Cited

U.S. PATENT DOCUMENTS 4,403,560 9/1983 Makabe et al. ...................... 112/454
4,495,877 1/1985 Willenbacher ................. 112/121.11
4,526,114 7/1985 Martell et al. .................. 112/315 X Primary Examiner—Peter Nerbun
Attorney, Agent, or Firm—Morgan & Finnegan

[57] ABSTRACT

A sewing machine capable of multiple functions including terminating stitches at a predetermined point, carrying out predetermined stitch patterns, automatic stitch pitch adjustment, stopping at preset points and thread cutting without operator intervention. These operations are controlled by means of a computer interface with the sewing machine and can carry out labeling, pocket attachment, collar attachment, cuffs etc. at preset intervals.

2 Claims, 26 Drawing Figures

METHOD AND APPARATUS FOR PERFORMING SEWING OPERATIONS UTILIZING SEWING MACHINE HAVING MEANS TO ADJUST TERMINAL STITCH PITCH AND SEW CONSECUTIVE PATTERNS

FIELD OF THE INVENTION

This invention relates to programmable sewing machines which create stitch lines while keeping predetermined margin distance at a workpiece.

BACKGROUND OF THE INVENTION

Referring to FIGS. 23A–23D, stitch patterns are continuously performed for example, on labels, pockets, collars and/or cuffs (Numbers 1-6 indicate order of stitch works). Since each stitch pattern is different, an operator ordinarily has to operate a control panel each time to input the data for each stitch pattern, This procedure which requires an operator to input stitch pattern data each time the stitch pattern is changed, is generally inefficient and can result in input errors. These errors also can result in damage to the workpiece.

SUMMARY OF THE INVENTION

One embodiment of the present invention includes a sewing machine capable of multiple functions including terminating stitches at a predetermined point, carrying out predetermined stitch patterns, automatic stitch pitch patterns, automatic stitch pitch adjustment, stopping at a preset point and thread cutting without operator intervention. These operations are controlled by means of a computer interface with the sewing machine and can carry out labeling, pocket attachment, collar attachment, cuffs etc., at preset intervals.

To solve the problems present in the prior art, this invention automatically inputs the different stitch patterns according to a predetermined schedule. When the end of one stitch cycle is detected, the next stitch pattern, which is already stored in the memory means, is selected from a plurality of stitch pattern data stored therein by a selection means. Thus the feeding work proceeds according to a preselected stitch pattern.

Throughout the drawings, numeral 1 denotes the workpiece end detecting means, 2 denotes the workpiece feeding means, 4 denotes the micro computer.

DETAILED DESCRIPTION OF PREFERRED EMBODIMENTS

Figure 1:
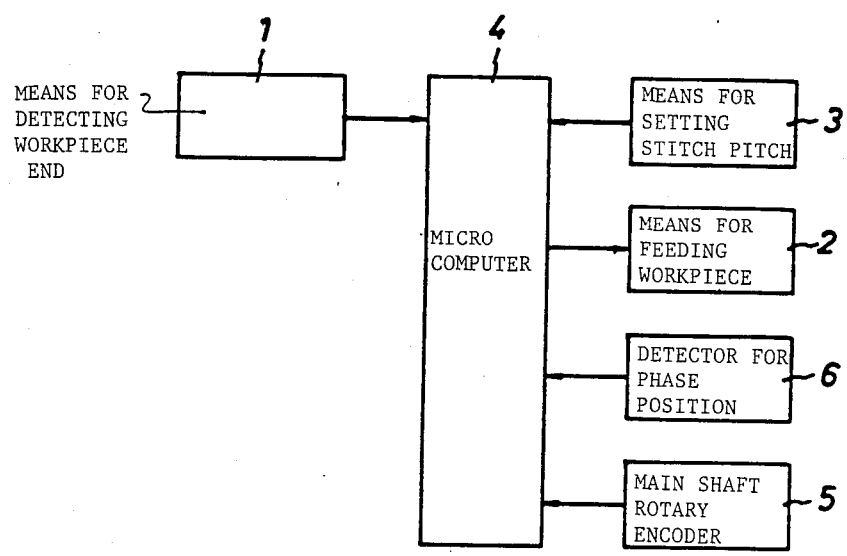
FIG. 1 is a block diagram showing one embodiment of this invention.
Figure 2:
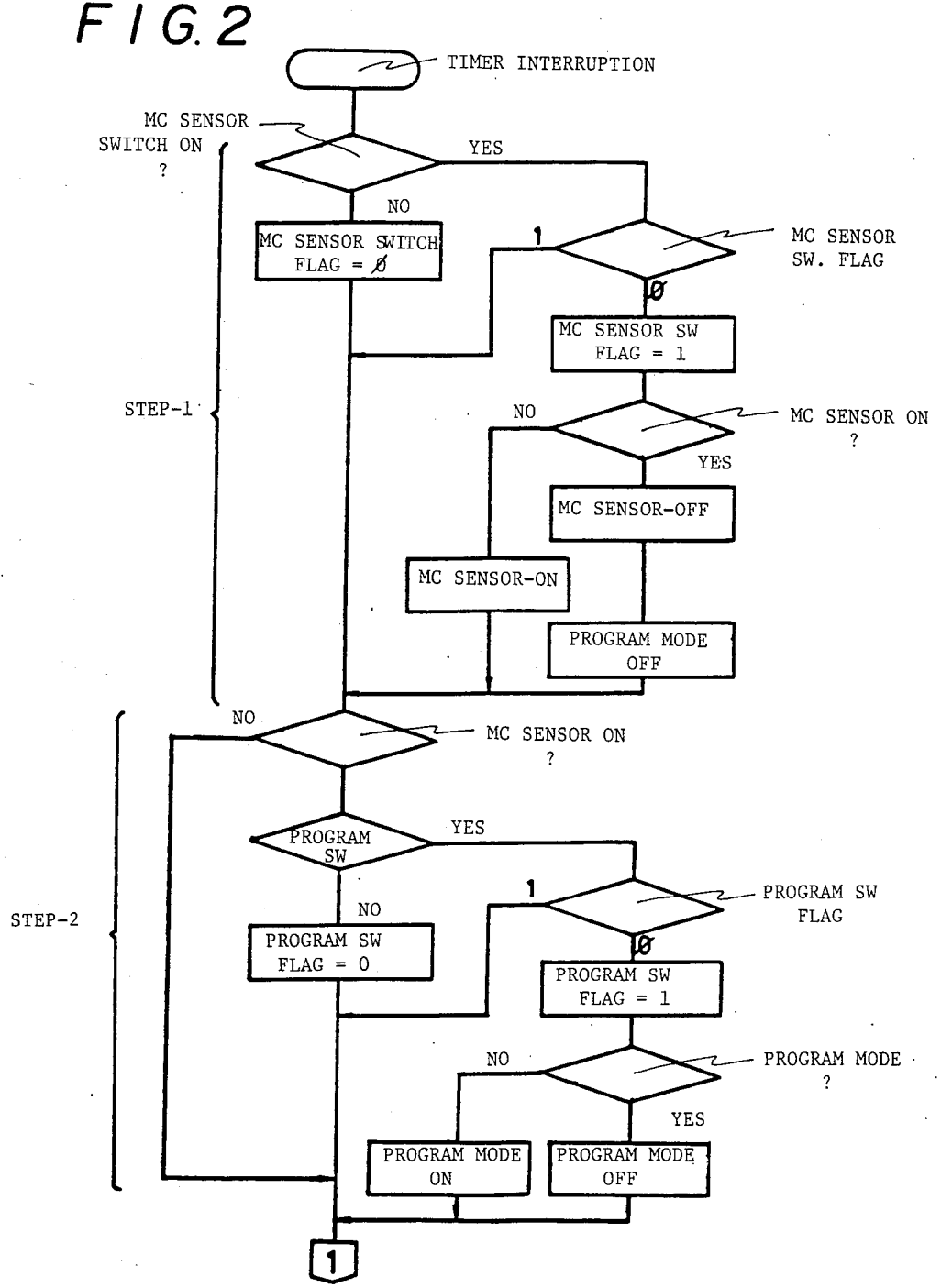
FIG. 2 to FIG. 9 are flow charts detailing how stitch patterns are inputted according to one embodiment of this invention.
Figure 3:
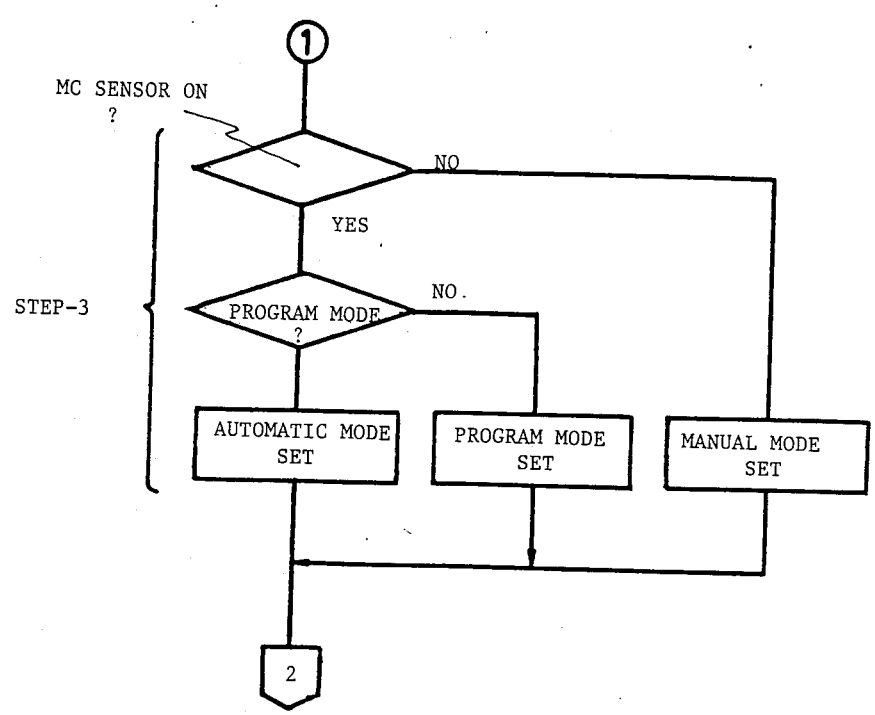
Figure 4:
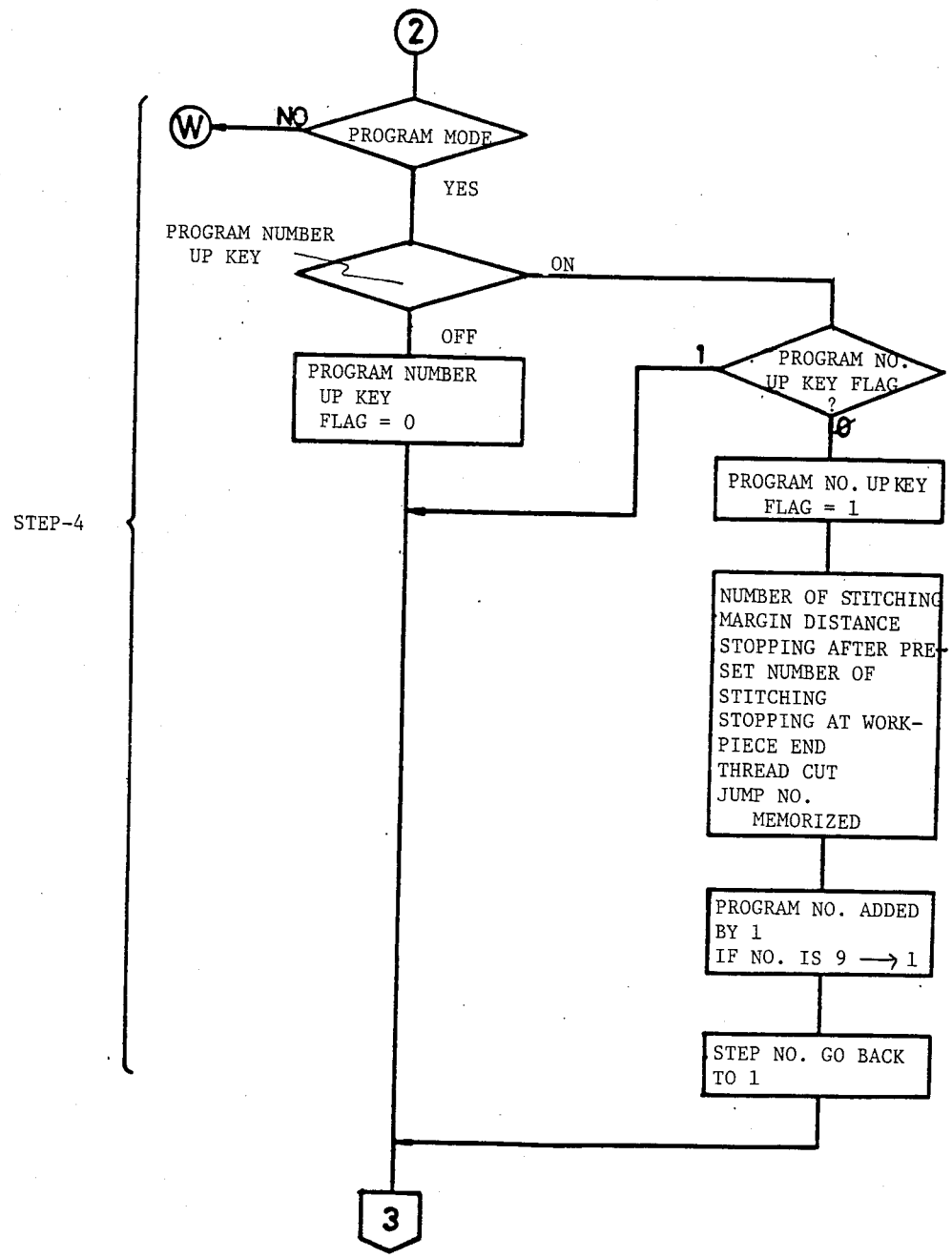
Figure 5:
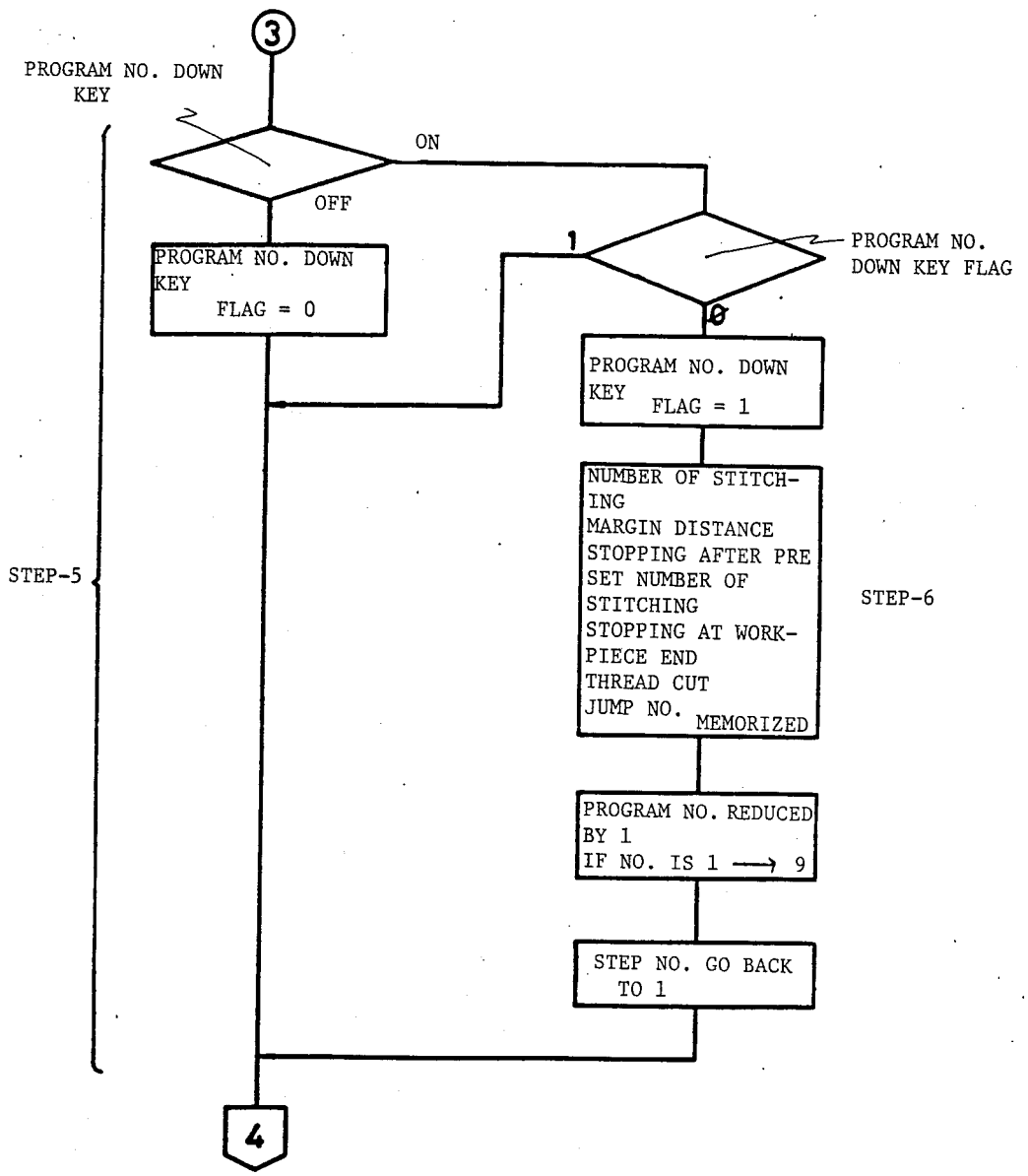
Figure 6:
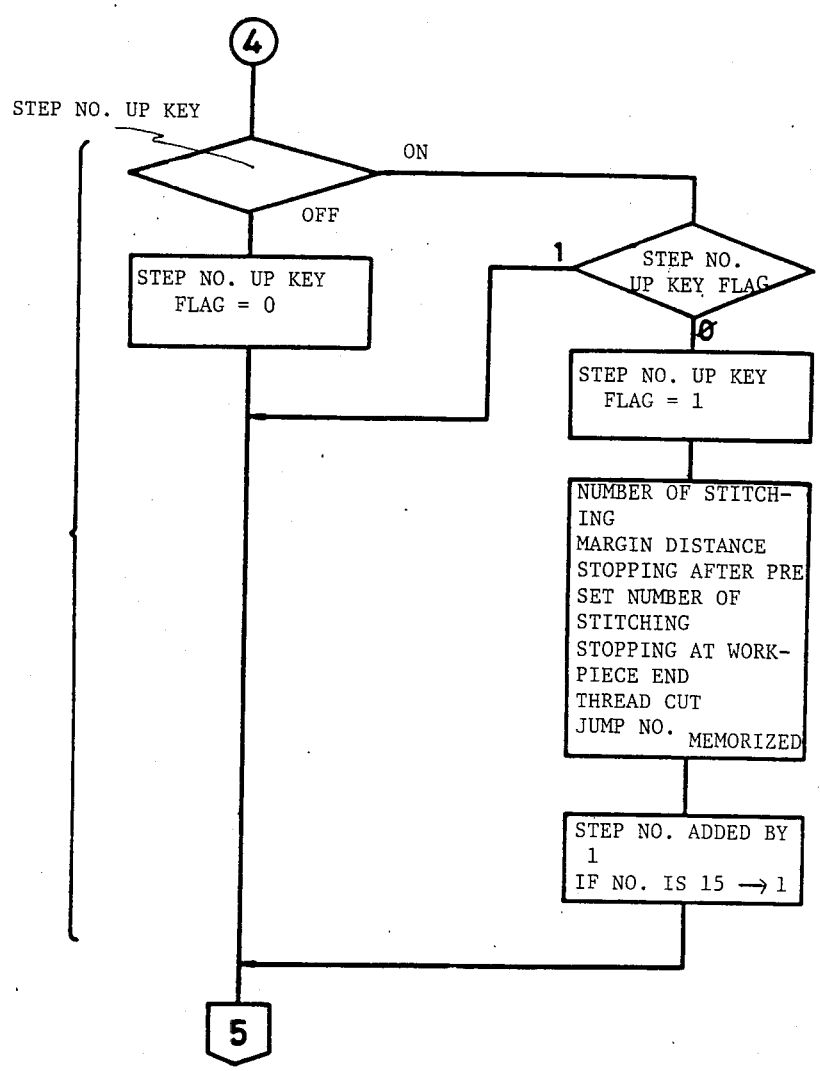
Figure 7:
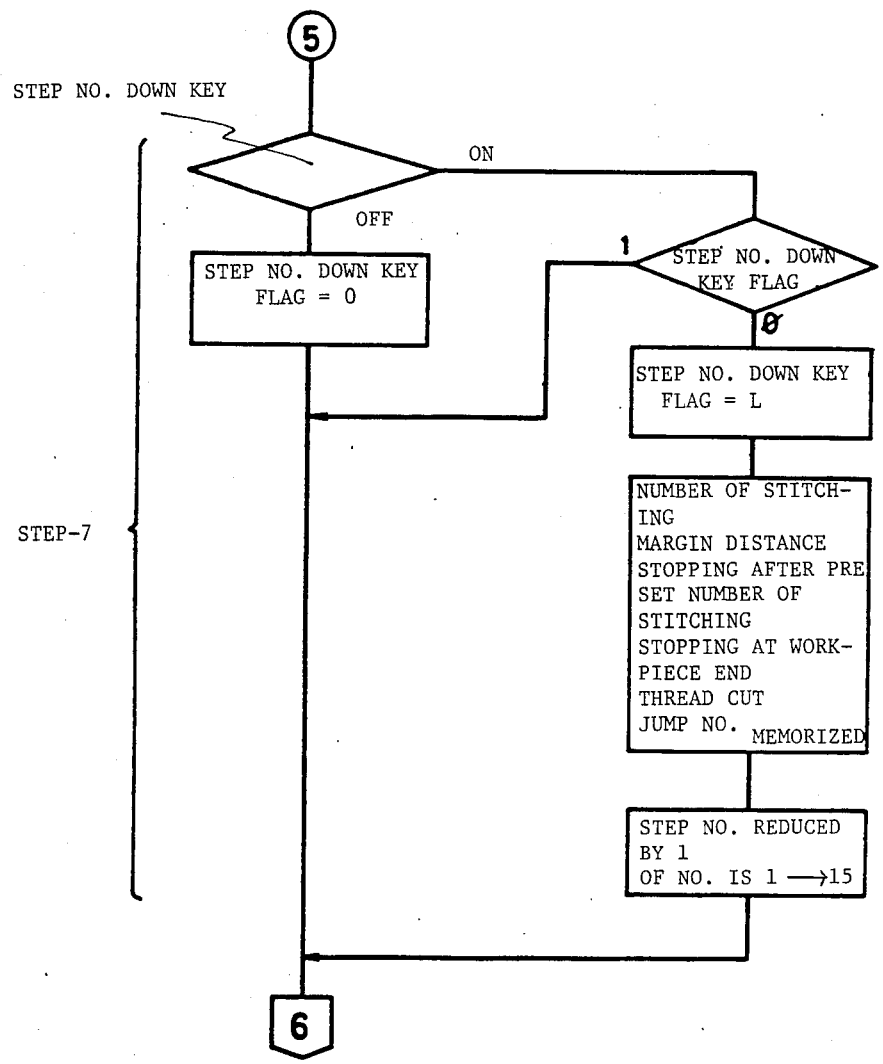
Figure 8:
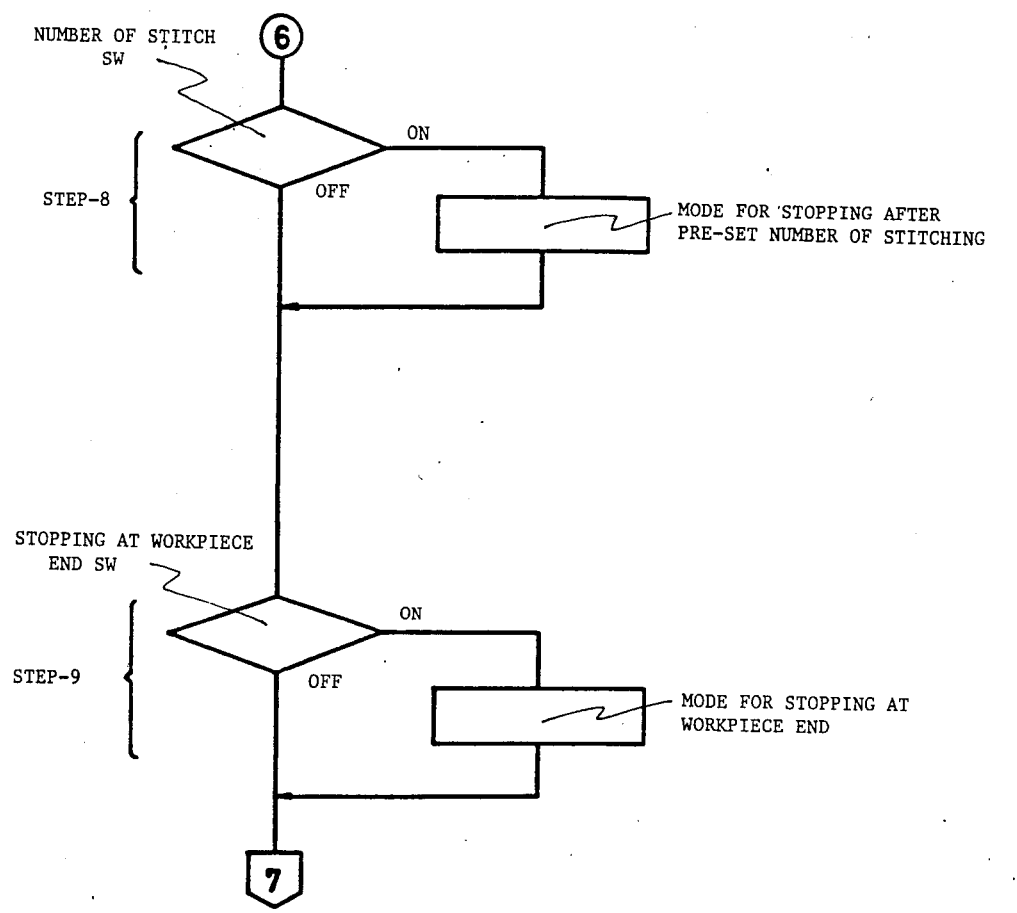
Figure 9:
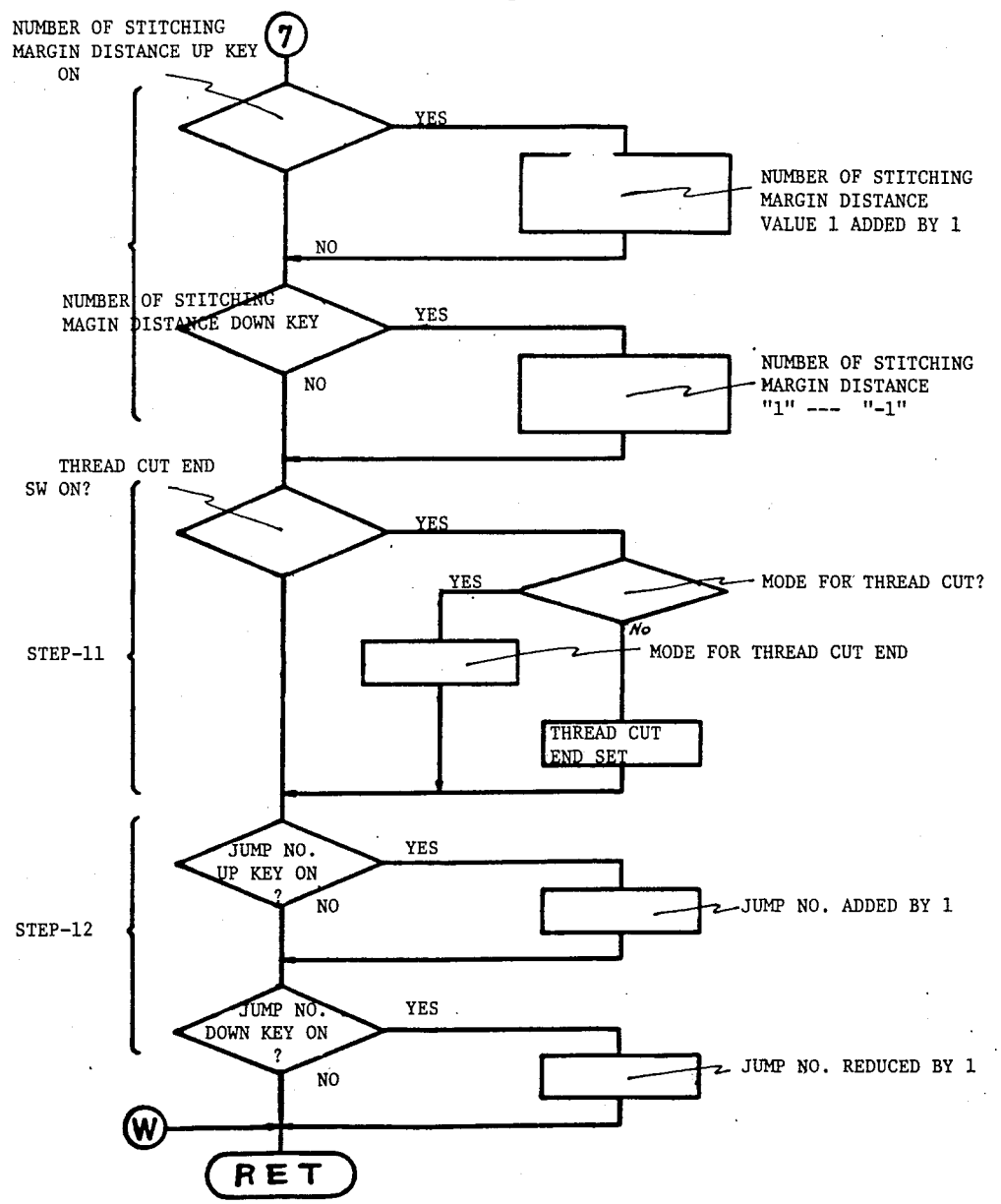

Referring to the accompanying drawings and, in particular, to FIG. 1 to FIG. 22, one embodiment of the present invention is explained. As shown in FIG. 1, numeral 1 denotes a workpiece-end detecting means and comprises a projector and a sensor which are well known in the art. Numeral 2 represents a feeding means which operates in accordance with a predetermined feed calculated by a feed calculating means. Numeral 4 is a micro computer comprising a memory means to store a plurality of different stitch patterns, a detecting means to detect the end of one stitch cycle and a selecting means to select the next stitch pattern from said memory means when end of one stitch cycle is detected. Numeral 5 denotes a main shaft rotary encoder. Numeral 6 represents a phase detector which detects the phase position of the feed.

The inputting of a stitch pattern in this embodiment is accomplished as shown in the flow charts of FIG. 2 to FIG. 9.

Figure 10:
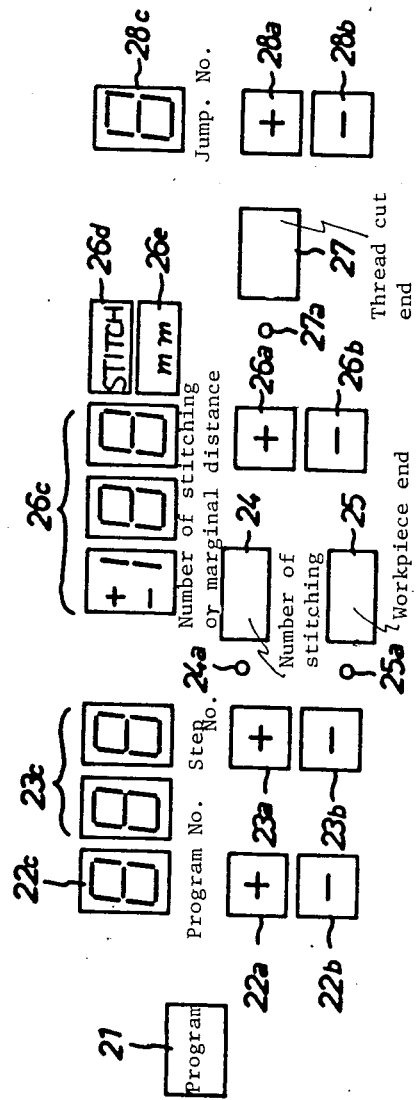
FIG. 10 shows one example of keyboard for inputting the stitch pattern data according to one embodiment of this invention.

A console panel, as shown in FIG. 10, is used to input data utilizing the following steps. (a) Motor control (MC) sensor switch 20 is turned on (Step 1), lighting indicator 20a. (b) Program switch 21 is then activated and the unit is maintained in the program mode. (This stage is also indicated by a lamp 21a.)

(c) Program number indication panel 22c (FIG. 10) is then set by moving the numerical display up/down or using program number key 22a or a program-number key 22b (Step 4, 5). Once the program number is set, the number of stitches (24), margin distance (26c), required number of stitches up to last (26d), thread cutting end (25) and jump numbers (28c) are stored into the memory of computer 4. (d) In step-up-number-indicator 23c, step number keys 23a and/or 23b are pressed to set the step number.

Once these setting operations are complete, the number of stitches, margin distance, number of stitches to last point, thread cutting end, and jump numbers are stored into the memory. (e) Stich number key 24 is pressed to activate the stop after pre-set number of stitches mode and indicators 24c and 26d are lit. Workpiece end key 25 is pressed when the desired mode is stop at workpiece end and indicator 25a and 26e are lit. Pressing keys 24 or 25, sets the desired mode (Step 8, 9).

(f) Referring now to FIG. 10 and, specifically, indicator 26c, by pressing key 26a (for number up) or key 26b (for number down), the number of stitches and the margin distance can be set (Step 10). (g) Thread-cut-end-key 27 is activated to end the stitch cycle after thread cutting in complete (Step 11). When this is done, indicator 27a is lit. (h) Next, jump numbers are then set by pressing keys 28a/28b as shown by display 28c (Step 12).

Once these steps are complete, steps (c)–(h) are repeated to program the next stitch pattern. Table 1 below explains the stitch patterns shown in FIGS. 23A–23D.

TABLE 1
STITCHING PROGRAM
Mode for stopping
Stopping at predetermined Margin distance or Stopping after pre-set number of Stitching

| Program Number | Step Number | Margin or Number of stitching | Margin distance or number of stitching | Mode for Finishing | Jump Number |
|---|---|---|---|---|---|
| 1 | 1 | Margin | 1 mm | | |
|   | 2 | Margin | 1 mm | | |
|   | 3 | Margin | 1 mm | | |
|   | 4 | Margin | 1 mm | Thread cut | 3 |
|   | 5 | | | | |
|   | 6 | | | | |
| 2 | 1 | Number of stitching | 3 | | |
|   | 2 | Margin | 1 mm | | |
|   | 3 | Margin | 1 mm | | |
|   | 4 | Margin | 1 mm | | |
|   | 5 | Margin | 1 | | |
|   | 6 | Number of stitching | 3 | Thread cut | 1 |
| 3 | 1 | Margin | 5 mm | | |
|   | 2 | Margin | 5 mm | | |
|   | 3 | Number of stitching | 35 | Thread cut | 4 |
|   | 4 | | | | |
|   | 5 | | | | |
|   | 6 | | | | |
| 4 | 1 | Margin | 5 mm | | |
|   | 2 | Margin | 5 mm | | |
|   | 3 | Number of stitching | 20 | Thread cut | 2 |
|   | 4 | | | | |
|   | 5 | | | | |
|   | 6 | | | | |

Figure 11:
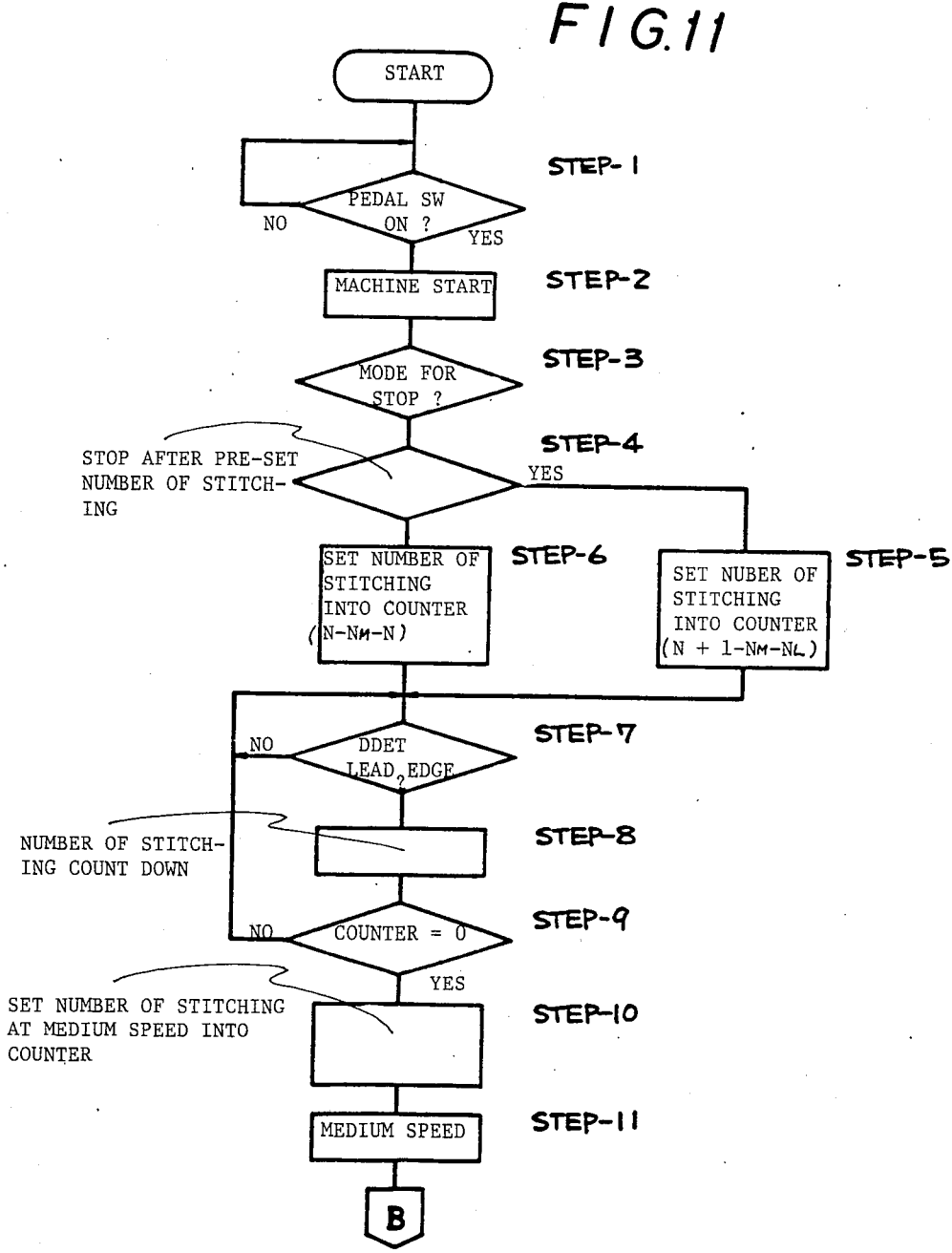
FIG. 11 to FIG. 13 are flow charts displaying the "stopping after pre-set number of stitches" mode.
Figure 12:
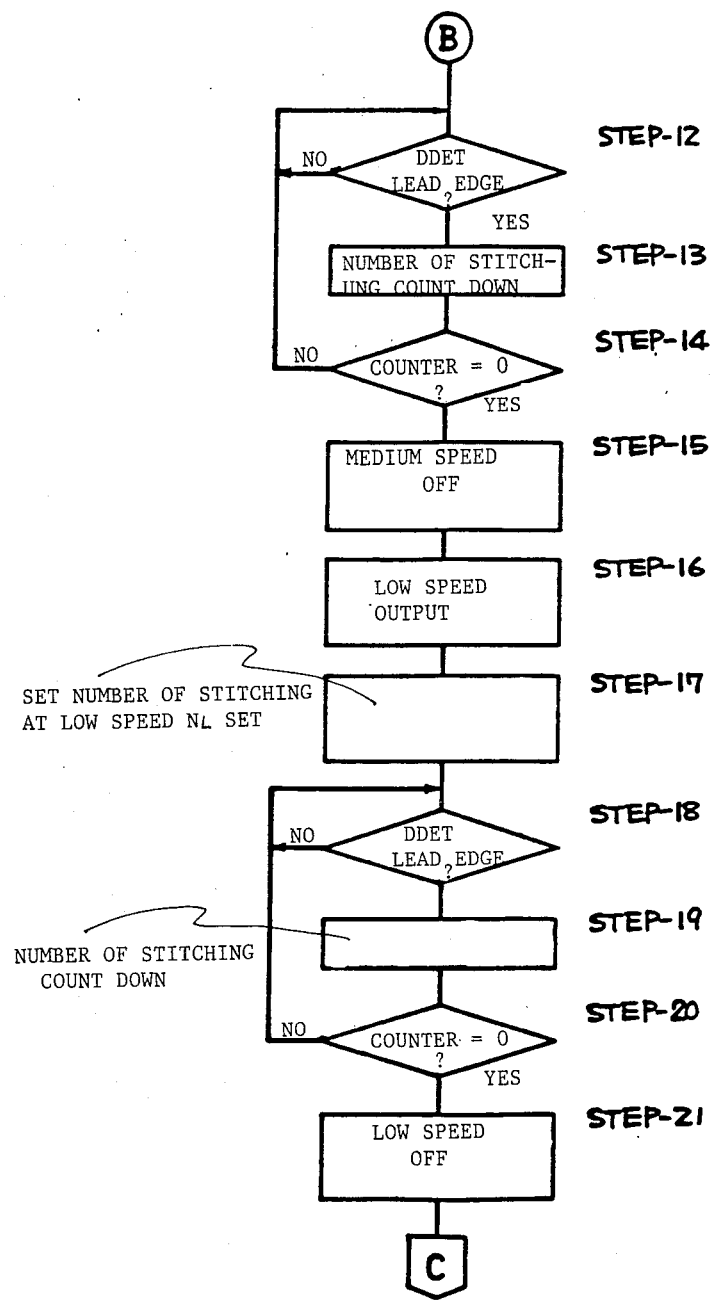
Figure 13:
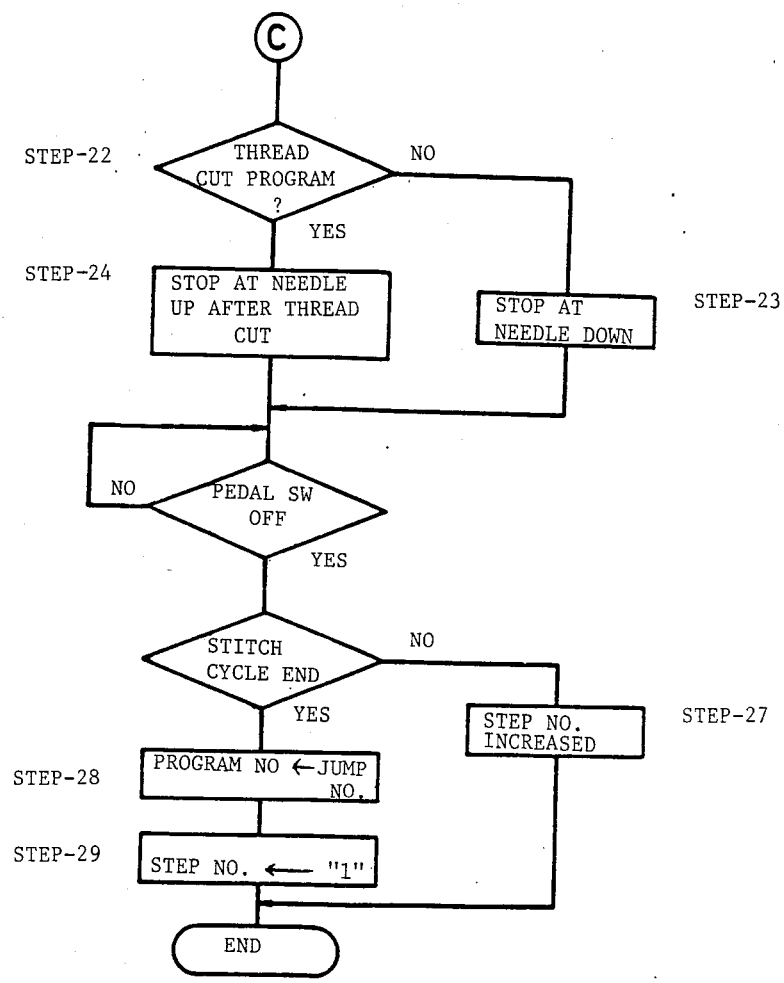

Stopping after pre-set number of stitches and stopping at workpiece end modes are incorporated with stitching work as follows. Referring to FIG. 11–FIG. 13 and flow charts FIG. 18–FIG. 22, when the pedal switch is activated (Step 1), stitching work starts. Stitching speed is regulated by the pedal switch. As the stitching work starts, micro computer 4 distinguishes mode for stopping from the present program number and step number. Micro computer 4 also determines if the unit is in the mode for "stopping after pre-set number of stitches" or the mode for "stopping at workpiece end."

When the program number is "1" (Step 4) and the stopping after a pre-set number of stitches is selected, the number of stitches is set into the stitch counter (Step 5). This number of stitches is represented by the algorithm, $[N+1-N_M-N_L]$, wherein "N" denotes number of stitches at this step. "$N_M$" denotes number of stitches at middle speed, "$N_L$" denotes number of stitches at low speed. The "+1" represents the first stitch to make a joint point. If the program number is not "1", $[N-N_M-N_L]$ is set into the stitch counter (Step 6). Once this step is complete, the DDET (signal of detecting needle down position) is checked (Step 7). This signal is counted down by the stitch number counter (step-8). When the counter has counted down to "0" (step-9) counter sets stitch number "N" at middle speed (Step 10), and stitching speed slows down to approximately 1500 RPM (Step 11).

The counter counts down each time the needle comes down and, when it reaches zero (Step 12–Step 14), the speed changes to approximately 200 RPM (Step 15, 16). In this case, number of stitches "N" is set into the counter (Step 17). The counter counts down each time the needle comes down (Step 18, 19). When the counter reaches zero (Step 20), the stitching at 200 RPM stops (Step 21). If the stitching is to continue, the machine stops with the needle in the down position (Steps 22, 23). If the stitching is to be ended, the thread is cut and the machine stops at the needle up position (Step 24). If stitching is to be continued after the pedal switch is shut off, the step number is increased.

Once end of cycle-stitching is detected, jump number, which is stored in the memory, is substituted for the program number (Steps 26, 27) resulting in a reading of the next pattern memory. In this case, the program number is "1" and the next program starts from the first step (Step 28).

Figure 14:
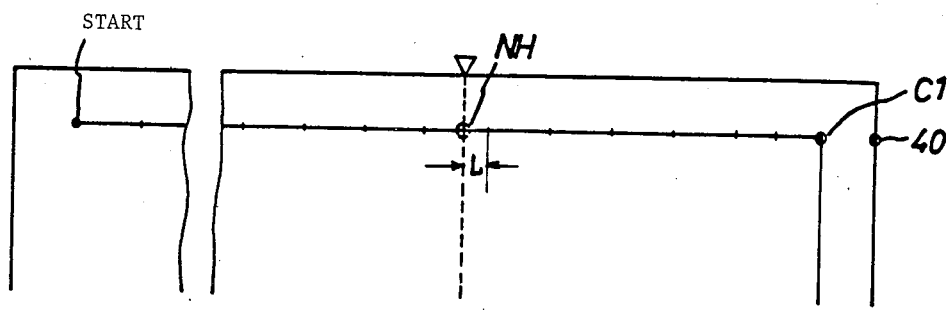
FIG. 14 depicts stitching after the workpiece-end-sensor has detected the workpiece in relation to the needle hole, and last margin point C1.
Figure 15:
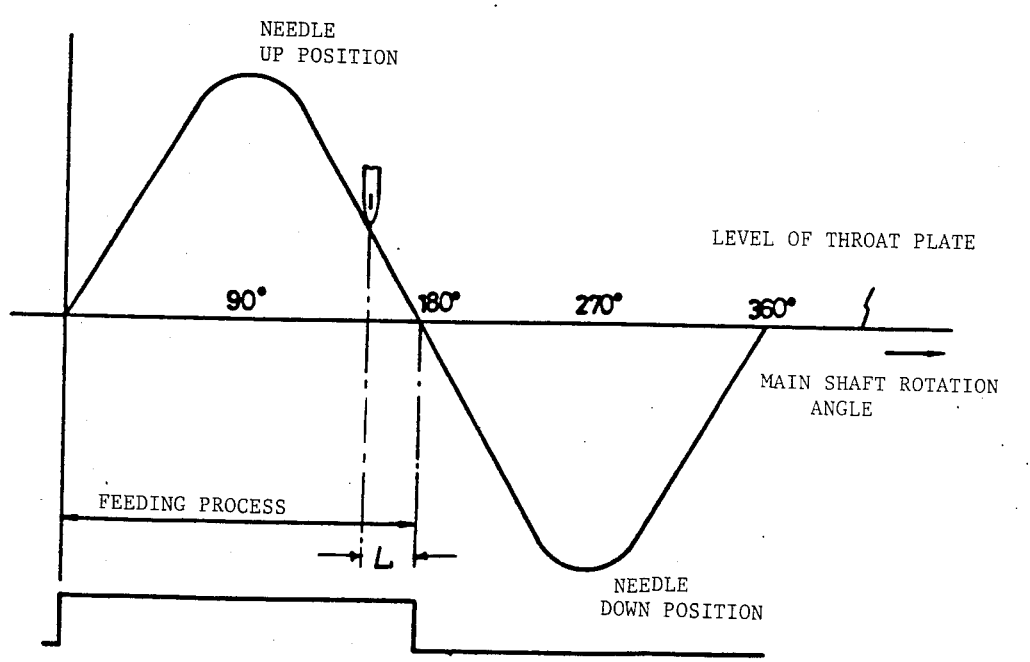
FIG. 15 shows the relation between needle position and feeding process.
Figure 16:
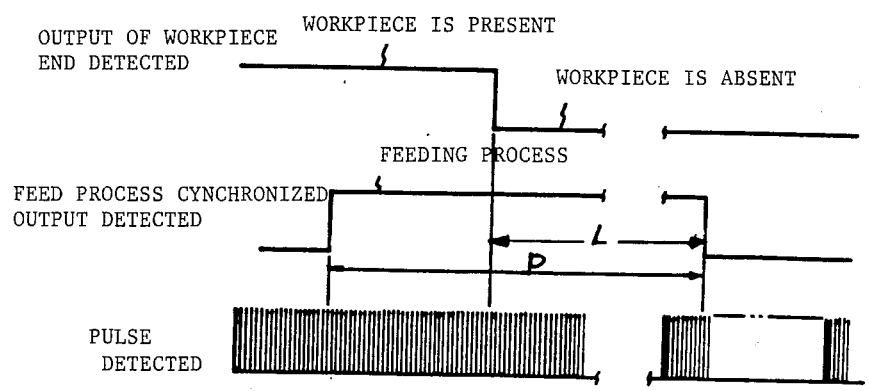
FIG. 16 and FIG. 17 show a timing chart in relation to stitch pitch.

Mode for stopping at workpiece end is shown in FIG. 14. Stitching work is started at a start point with stitch pitch "P" and once complete, the workpiece-end-sensor detects the workpiece end when stitching proceeds to the point "NH". In this case, the output level of signal from the workpiece-end-sensor changes from (H) to (L) (Step 30). The pulse number of main shaft when the workpiece-end-sensor detected the workpiece end is then determined. Referring to this pulse number and the stitch pitch P from TABLE 2 which is stored in RAM (RANDOM ACCESS MEMORY), the unfinished stitch pitch ratio (L/P) is derived. Here, "L" is the feed distance to finish the unfinished stitch pitch after the workpiece-end-sensor has detected the workpiece end (refer to FIGS. 15, 16).

TABLE 2
UNFINISHED STITCH PITCH %

| Number of pulse | PITCH (mm) | | | | | | |
|---|---|---|---|---|---|---|---|
| | 2.5 | 2.25 | 2.0 | 1.75 | 1.5 | 1.25 | 1.0 |
| 0 | 100 | 100 | 100 | 100 | 100 | 100 | 100 |
| 1 | 100 | 100 | 100 | 100 | 100 | 100 | 100 |
| 2 | 100 | 100 | 100 | 100 | 100 | 100 | 100 |
| 3 | 100 | 100 | 100 | 100 | 99 | 99 | 99 |
| 40 | 71 | 70 | 69 | 68 | 64 | 59 | 54 |
| 41 | 70 | 69 | 67 | 67 | 63 | 58 | 53 |
| 81 | 0 | 0 | 0 | 0 | 0 | 0 | 0 |
| 82 | 0 | 0 | 0 | 0 | 0 | 0 | 0 |
| 83 | 0 | 0 | 0 | 0 | 0 | 0 | 0 |

EXAMPLE 1

From Table 2, where stitch pitch is 2 mm and pulse number counted is 40, the percentage of unfinished stitch pitch is 69%. Thus, the unfinished stitch pitch calculated is $2 \times 0.69 = 1.38$ mm. The number of stitches remaining after the workpiece-end-sensor is activated to point $C_1$ is derived from formula (1) below. The distance between the needle hole and point $C_1$ is derived from formula (2).

$$N = (H - W)/P \tag{1}$$

"H" is the distance betwen the needle hole and the workpiece-end-sensor.

$$S = 100\,N - (L/P) \tag{2}$$

100 indicates one full stitch pitch.

As a next step, zero (0) is set (Step 34) into the stitch number counter Mn. Then stitching continues until the distance S becomes shorter than 100 with the stitch pitch as originally set. (Steps 35–37). When the distance S becomes less than 100, the adjusted stitch pitch X is derived from formula (3).

$$X = [(100+S)/2]P/100 \quad (3)$$

Using the "X" value as a reference, from the table stored in the ROM (READ ONLY MEMORY), the adjusted angle for the stepping motor which regulates the stitch pitch (Step 38) is derived. The rotation of this stepping motor is conducted when the timer switch is interrupted and stays at the rotated condition (Step 39).

The next step involves setting the stitch number at high speed into the stitch number counter using the formula:

$$Mn(=Mn+2-5) \text{ (Step 40)}$$

This high speed stitch number is derived by adding 2 stitches just after the sensor has detected and the stitching mat point $C_1$ and reducing 2 stitchings at 1500 RMM, 2.5 stitchings at 500 RPM, and 0.5 stitchings at 200 RPM (Step 45–48).

When a signal (SYNC) from a phase detector sychronizing with main shaft rotation is down-edged, the electric current to a solenoid is increased (Step 51) and the solenoid is activated (Step 52). In this case, the stitch pitch is adjusted from the original pitch, and the stitching is conducted with this adjusted stitch pitch.

Figure 17:
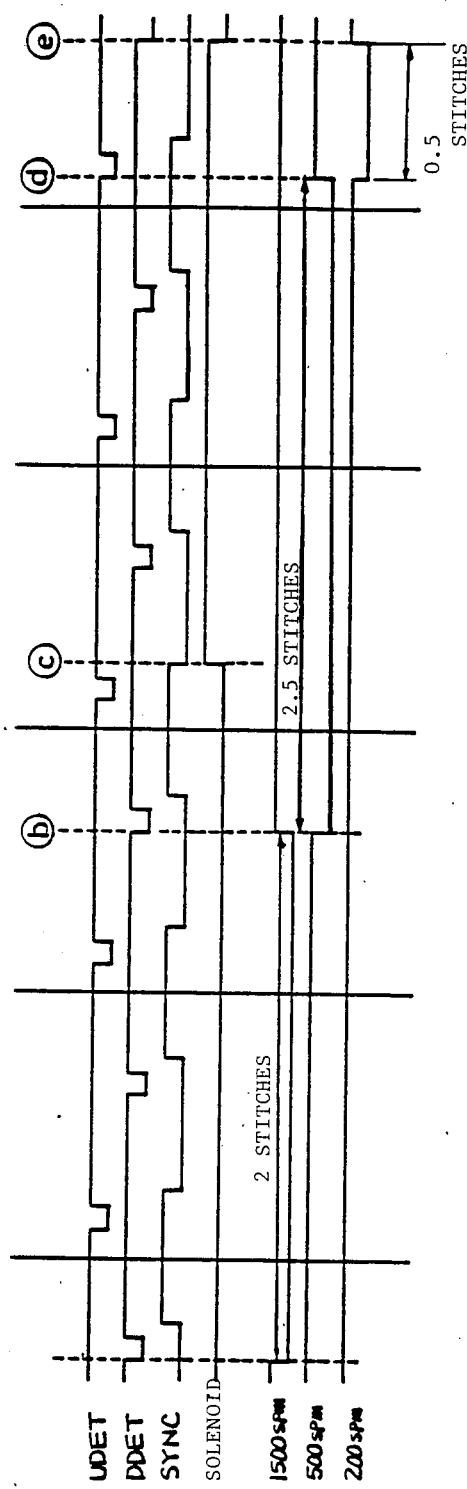
Figure 18:
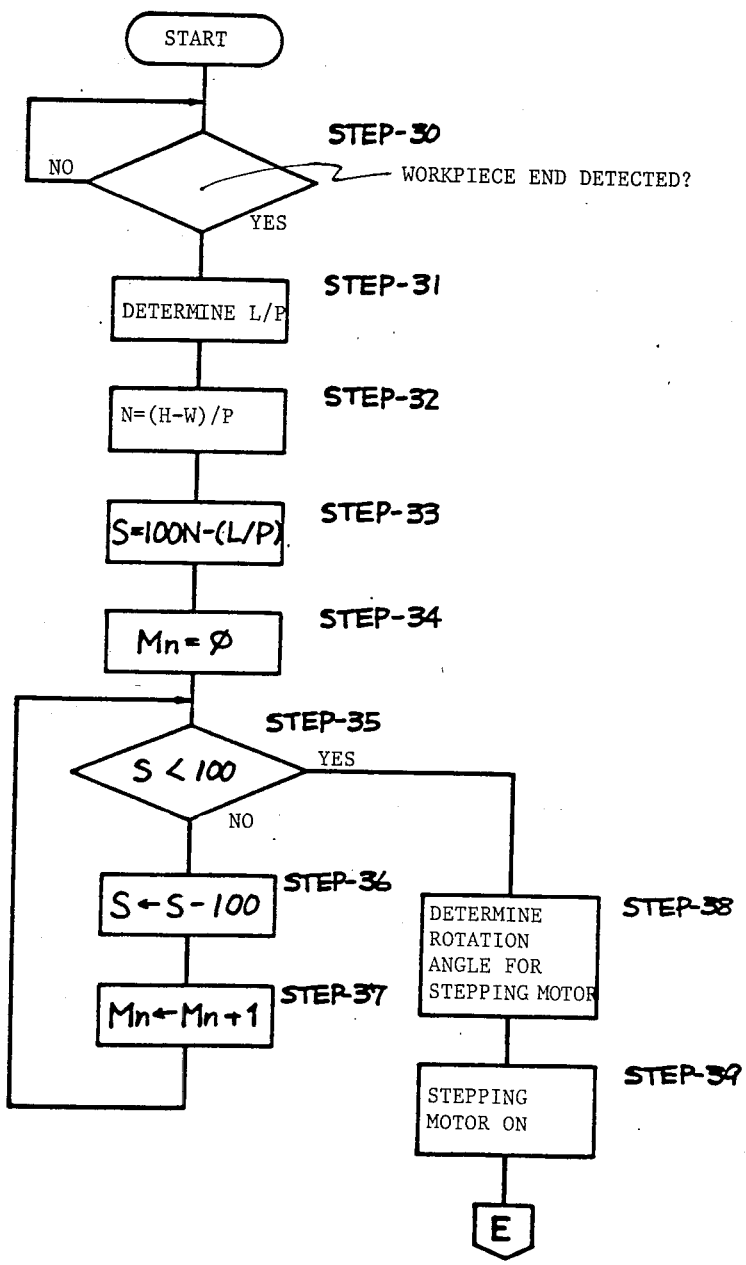
FIG. 18 to FIG. 22 are flow charts showing the "stopping at the workpiece end" mode.
Figure 19:
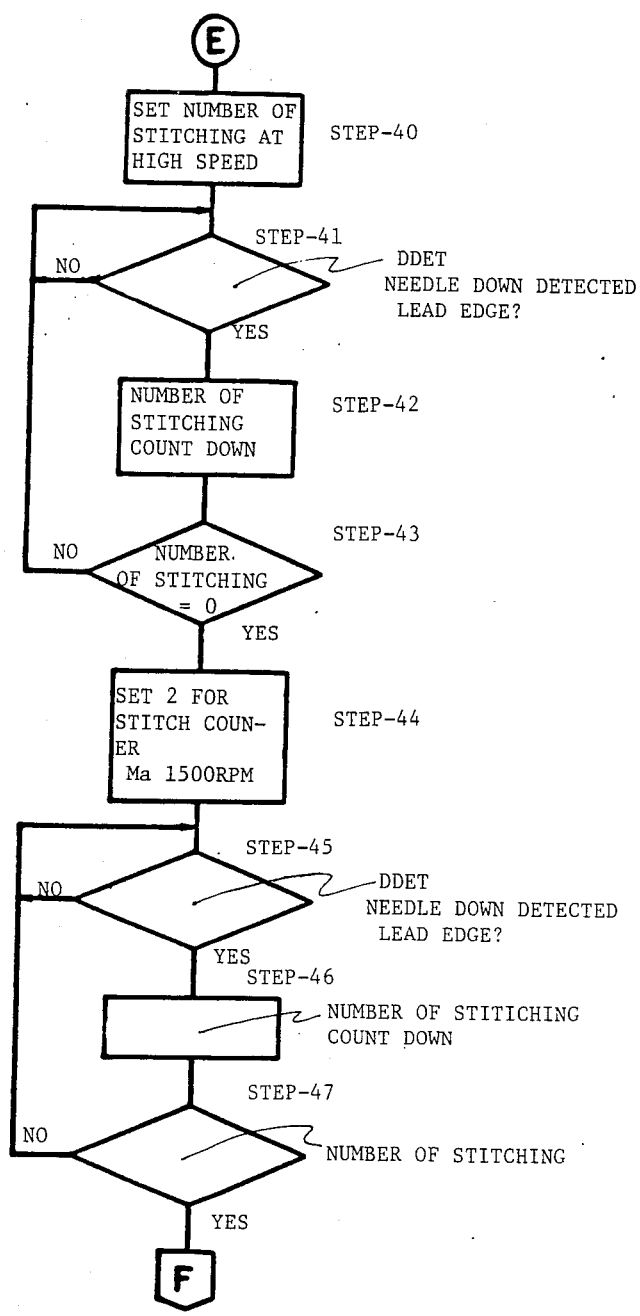
Figure 20:
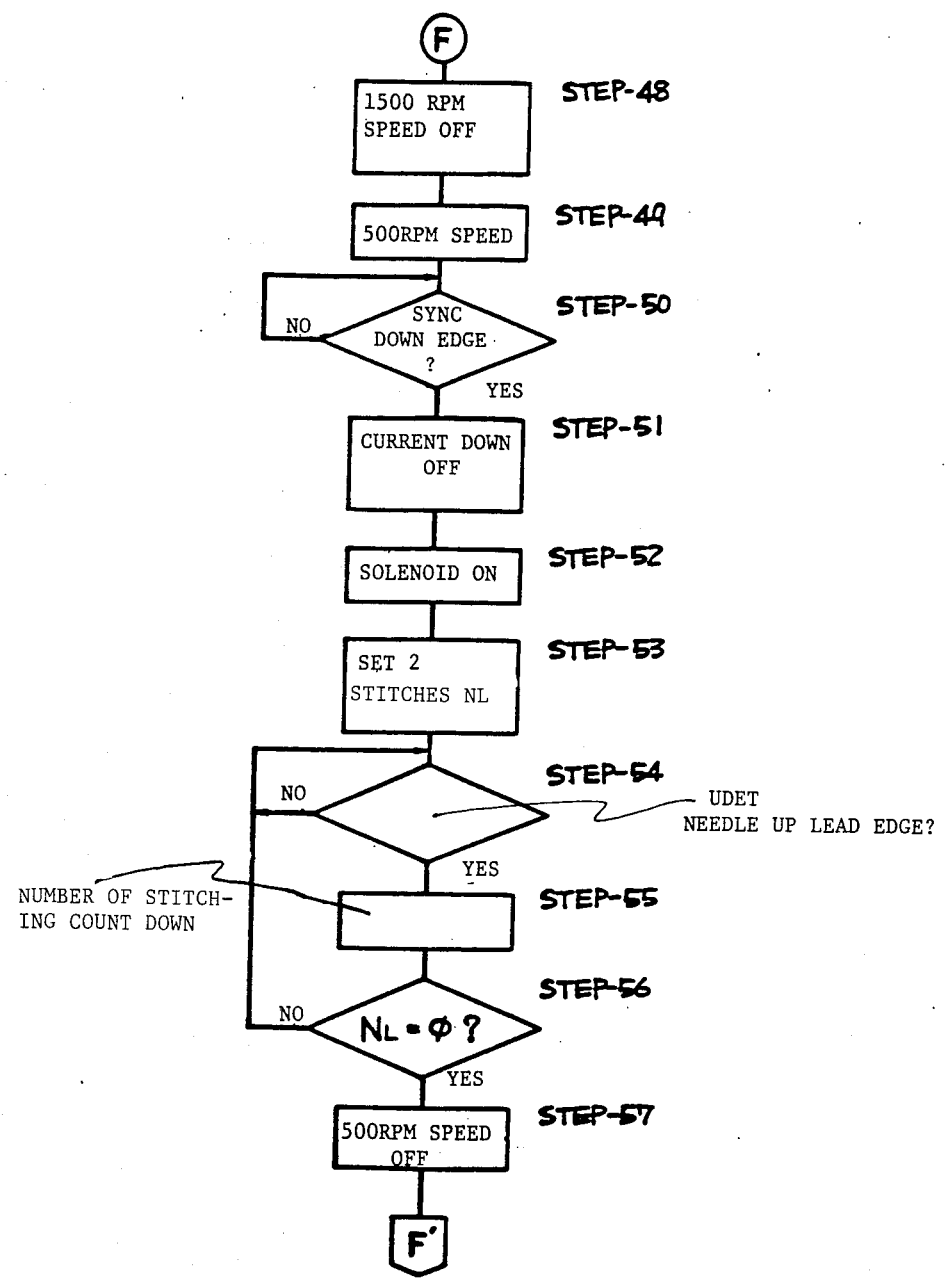
Figure 21:
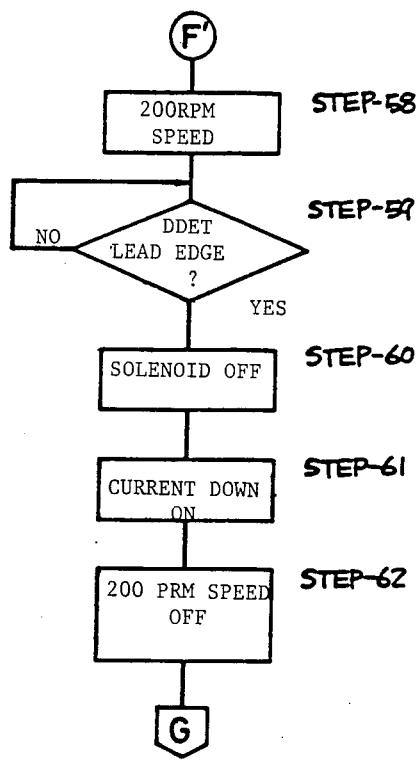
Figure 22:
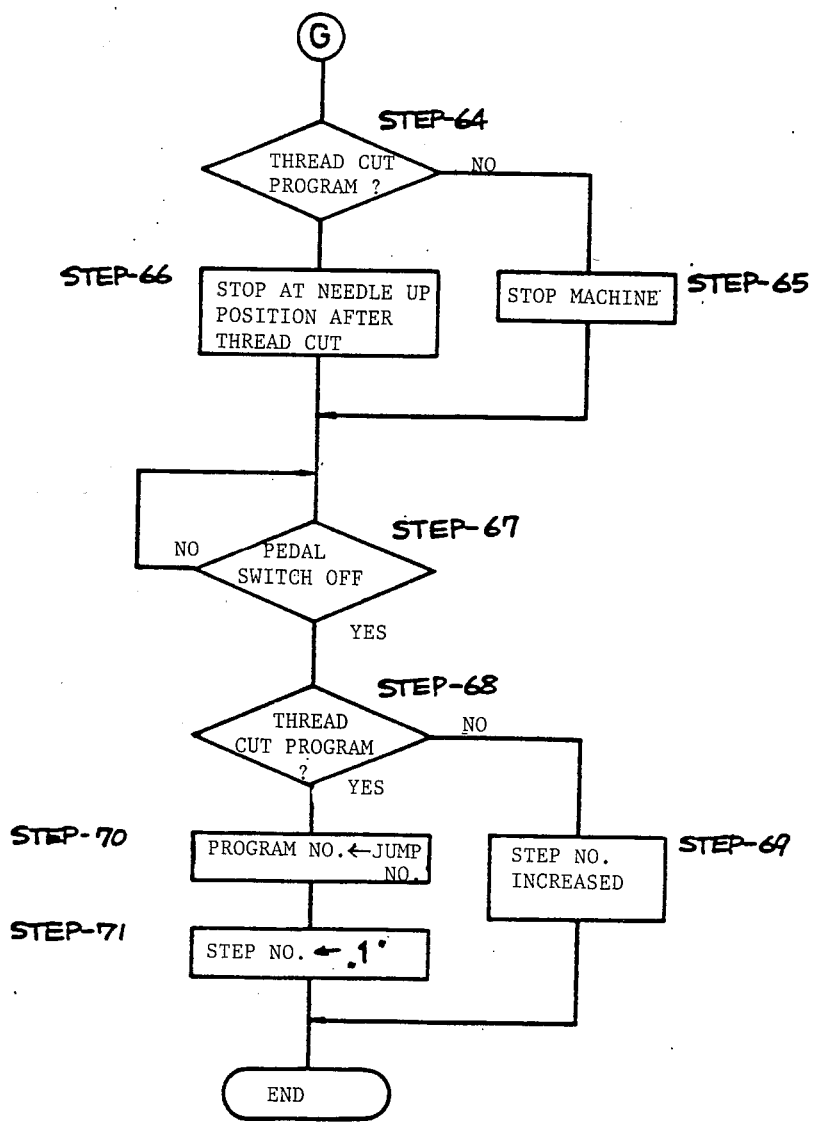
Figure 23A:
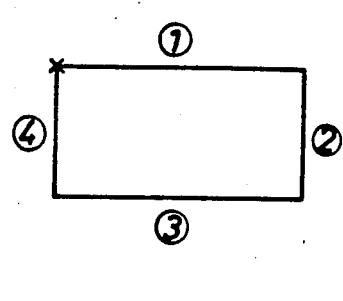
FIG. 23 A-D show sample stitch patterns.
Figure 23B:
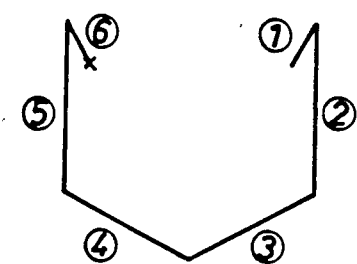
Figure 23C:
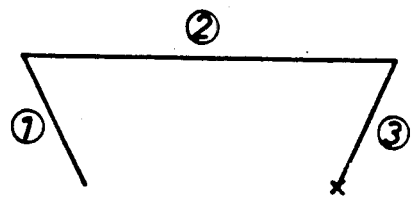
Figure 23D:
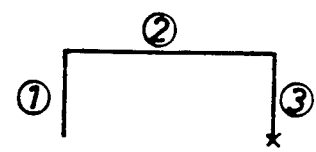

Referring now to FIG. 17, at (b) the machine starts at a rate of 2.5 stitchings at 500 RPM (Step 54–56). At (d), the speed changes from 500 RPM to 200 RPM (Step 57–58), and 0.5 stitches at 200 RPM and, in turn, at point (e) where the needle moves to the down position (Step 59) the solenoid is unexcited (Step 60) and the electric current to the stepping motor is reduced (Step 61). At this point, the 200 RPM stitching is stopped and the sewing machine stops (Step 62). If the stitching is to be continued, the needle stops in the down position (Steps 64, 65). If the stitching is to be ended, the thread cut is activated and at the needle stops in the up position (Step 66). Then pedal switch is then shut off (Step 67).

If the stitching is to be continued, the step number is increased (Steps 68, 69). If the end of one stitch cycle is detected, the jump number stored in the memory is substituted into the program number (Steps 68, 70), and next program memory is read. The step number is set to "1", and the next program is started from step number 1 (Step 71).

According to Table 1, stitching will be conducted in the order of program 1, 3, 4, 2. That is, in the order of label, neck bound, cuff and pocket.

As described above, according to this invention, when end of one stitching cycle is detected, next stitch pattern data is selected, and according to this selected data, the stitch pitch is controlled. Thereby, stitching according to the pattern is automatically stitched, thus, efficiency of stitching work is increased.

As many apparently widely different embodiments of the invention may be made without departing from the spirit and scope therein, it is to be understood that the invention is not limited to the specific embodiments herein except as defined in the appended claims.

What is claimed is:

1. A sewing machine capable of automatically adjusting stitch pitch to terminate the last stitching at a predetermined margin distance by calculating a number of stitches with original pitch and the adjusted pitch which is shorter than the original pitch when a workpiece end sensor detects the workpiece end, comprising:

storing means to store stitch data corresponding to a plurality of different stitch patterns;

detecting means for detecting end of a stitching cycle;

selection means for selecting stitch data corresponding to a subsequent stitch pattern from said storing means when end of one stitch cycle is detected;

calculating means for calculating stitch pitch by referring to said selected stitch data corresponding to a subsequent stitch pattern selected by said selection means; and adjusting means for automatically adjusting stitch pitch.

2. A method for performing sewing operations on a workpiece using a sewing machine capable of adjusting stitch pitch to terminate the last stitching at a predetermined margin distance by calculating a number of stitches with original pitch and the adjusted pitch which is shorter than the original pitch when a workpiece end sensor detects the workpiece end, said method comprising the steps of:

storing stitch data corresponding to a plurality of different stitch patterns:

detecting the end of a stitching cycle;

selecting the stitch data corresponding to a subsequent stitch pattern from the stored stitch data when the end of a stitching cycle is detected;

calculating the stitch pitch by referring to said selected stitch data corresponding to a subsequent stitch pattern; and adjusting stitch pitch.

* * * * *